Patented June 29, 1954

2,682,534

UNITED STATES PATENT OFFICE 2,682,534

PREPARATION OF CELLULOSE ACETATE SORBATE

William B. Hewson, Wilmington, Del., assignor to Hercules Powder Company, Wilmington, Del., a corporation of Delaware No Drawing. Application June 25, 1952, Serial No. 295,573

9 Claims. (Cl. 260—225)

This invention relates to the preparation of cellulose esters containing unsaturated organic ester groups and, more particularly, to the preparation of cellulose acetate sorbate.

Simple and mixed esters of cellulose containing unsaturated organic ester groups have been disclosed in the art. While several of these esters are known to require special conditions for their preparation, none of them has enjoyed commercial success because methods amenable to commercial production of stable products have been lacking. Known commercial processes have failed because of difficulty in getting sufficient efficiency of substitution of the unsaturated organic acid or because of reaction of the unsaturated organic acid with the esterification catalyst, resulting in loss of unsaturation and low stability, or because of premature polymerization of the unsaturated acid either before or after combination with the cellulose or, on the other hand, because the particular product was so resistant to reaction that the cross-linking characteristic was lacking.

The usual commercial process for the production of cellulose esters involves esterification of the cellulose ester to a D. S. of 3 followed by hydrolysis to a lower D. S. in order to obtain the desired solubility characteristics. The relative east of introduction of an unsaturated acid group in the esterification process and the relative ease of its removal in the hydrolysis process compared to acetic acid are extremely important in such a process, not only as a factor in determining whether the process is possible, but also because of the economic requirement of recovering the unreacted or hydrolyzed acids in the process and because the characteristics of the product depend greatly on the proper D. S. of the unsaturated group in the cellulose ester.

For commercial success the cellulose ester must, accordingly, be produced from an unsaturated acid having an optimum degree of reactivity not only with respect to ease of cross-linking but also with respect to the esterification and hydrolysis reactions involved in production of the ester.

It is an object of this invention to produce a mixed cellulose ester containing saturated and unsaturated aliphatic acids by a commercially adaptable process. It is a further object to produce such a mixed ester of cellulose in an uncross-linked state and to provide an ester which can be subsequently cross-linked when desired. It is also an object to produce a mixed cross-linkable cellulose ester having good solubility in organic solvents prior to cross-linking and having poor solubility in organic solvents after cross-linking. It is a further object to produce such a cross-linkable mixed ester of cellulose that has good heat stability characteristics. It is a still further object to provide a process whereby such an ester can be produced.

These objects are accomplished by the following invention wherein a cellulose acetate sorbate having a total acyl D. S. in the range of 2.2 to 2.9 and a sorboyl D. S. in the range of 0.01 to 0.35 is produced.

In accordance with this invention, cellulose is completely acylated in the presence of methylene chloride and a minimum effective catalytic amount of sulfuric acid with an anhydride mixture of acetic and sorbic acids, the sorbic acid amounting to 0.0023 to 0.13 mole fraction and the anhydride value of the mixture amounting to at least 3 moles anhydride per anhydroglucose unit, and the completely acylated cellulose ester is partially hydrolyzed at a temperature on the average of 50°–55° C. but at no time exceeding about 65° C. to a total acyl D. S. in the range of 2.2 to 2.9 in the presence of no more sulfuric acid than was used in the esterification step and 5 to 15% of an organic sulfonic acid based on the cellulose weight as a hydrolysis catalyst and in the presence of sufficient aqueous acetic acid containing 5 to 30% water to act as a solvent and source of water for hydrolysis, and a cellulose acetate sorbate having a sorboyl D. S. in the range of 0.01 to 0.35 is recovered from the hydrolysis reaction mixture. The cellulose acetate sorbate so prepared has the desired characteristics set forth above.

It has been found that the process of this invention is particularly suited to sorbic acid for it has the desired characteristics of efficiently reacting with cellulose under the conditions of reaction of this invention and of resisting hydrolysis sufficiently under the conditions set forth so as to provide a product of high sorboyl D. S. Moreover, the process has the further advantage in that conditions are such that unreacted sorbic acid is easily recovered from the spent acetic acid mixture. A further advantage lies in the fact that the process provides conditions for introduction of a predetermined optimum number of sorbate groups to provide the proper reactivity for ease and controllability of cross-linking with a very low sorboyl D. S. and thereby produces a product which in the uncross-linked state does not differ greatly in properties from cellulose acetate.

The following examples are presented to illustrate the process for the production of the cellulose acetate sorbate of this invention. All parts and percentages throughout this specification are by weight unless otherwise specified.

EXAMPLE 1

One hundred parts chemical cellulose moistened with 58 parts glacial acetic acid was placed in an acetylation mixer with 12.7 parts sorbic acid. To this was added a cold solution of 414 parts methylene chloride, 200 parts acetic anhydride, and 1.0 part 95.5% sulfuric acid dissolved in 50 parts acetic anhydride. The mixture was kneaded for 1.2 hours while the temperature was being raised to 45° C. The temperature of kneading was then maintained at 40°–45° C. for 3 to 4 hours, after which acylation was stopped by the addition of 108 parts water followed by 15 hours kneading at 38° C. Then 10 parts p-toluenesulfonic acid was added and kneading was continued at 50°–55° C. for 4 hours, after which 87 parts 32% sodium acetate was added with further kneading. The methylene chloride was evaporated under reduced pressure and the solid ester was precipitated by mixing with water. The material was then wet-ground, water-washed, and air-dried at 50°–90° C.

The resulting product had a sorboyl D. S. of 0.067 and an acetyl D. S. of 2.39. A 7.1% solution of this product in 9:1 acetone:ethanol solution containing 1% benzoyl peroxide based on the solids content was clear and colorless and a film formed therefrom was insolubilized by heating at 150° C. for 2 minutes. The insolubilized film was also clear, colorless, and odorless.

Examples 2 to 5 were carried out in essentially the same manner. The results of all five examples are summarized in the table below.

To avoid premature cross-linking due to the relatively high sorboyl D. S. in Example 5, hydroquinone was added along with the aqueous acetic acid in the hydrolysis step and the water used for subsequent washing contained 0.01% hydroquinone. The final wash water contained 0.05% hydroquinone. The resulting product had a much better stability toward premature cross-linking than a sample hydrolyzed and washed in the absence of hydroquinone.

In these examples and elsewhere the heat stability is recorded as "good" where the reflected color in daylight of a sample of cellulose acetate sorbate remained light, i. e., did not increase beyond 14 on the Gardner Color Standard scale when heated for two hours at 180° C. Samples which darkened further were classed as poor in the heat stability test.

Products of substantially the same analyses are obtained with the other organic sulfonic acids set forth hereinafter provided the time of hydrolysis at 50°–55° C. is properly selected to compensate for slight variations in activity among the catalysts.

The sorbic acid may be used in the esterification process either as the acid or as the anhydride or, alternatively, as a mixture such as is produced by warming a mixture of sorbic acid and acetic anhydride. When sorbic acid is used, it is believed that at least part of the sorbic acid forms an anhydride either with itself or with one of the other acids in the system. Likewise, when more than one anhydride is used in the acylation mixture, part of the anhydride is believed to be present as mixed anhydrides. The anhydride mixture will contain at least the theoretical amount of anhydride for complete esterification of the cellulose and for combination with any water liberated by such esterification. The acylation mixture may also contain, in addition to anhydride, part of the acid in the form of free acid which may act as a solvent.

For convenience in referring to the anhydride mixture of organic acids used for acylation, the ratio of acids in the mixture is referred to in terms of mole fraction of the mixture and the mole fractions are based upon the molecular weights of the acids themselves rather than those of the anhydrides. This is done for convenience in calculation since acids may be present not only as the free acid but also as the simple and mixed anhydride. Since the presence of anhydride is specified, the calculation of the components of the anhydride mixture in terms of moles of the acid involved is accurate and does not involve any ambiguity. Thus when the amount of anhydride is calculated as moles of acid, the moles acid is based upon the number of moles of acid which would result from hydrolysis of the anhydride. Since acetic acid will normally be used in the form of the anhydride, and sorbic acid will usually be measured in the form of the acid, it will be necessary, when large amounts of sorbic acid are used, to use sufficient excess organic anhydride in order to bring the total anhydride in the mixture up to the amount required for the esterification. In such cases, there is not any appreciable difference in results due to the form in which the acids are introduced even though the amount is expressed as moles of acid. In order to remain consistent, compositions are expressed in terms of the mole fractions rather than per cents. The mole fraction of sorbic acid in an anhydride mixture is thus the ratio of the moles sorbic acid which would

*Table*

| Example | 1 | 2 | 3 | 4 | 5 |
|---|---|---|---|---|---|
| Ingredients: | | | | | |
|   Cellulose | 100 | 100 | 100 | 100 | 100. |
|   Acetic acid (pretreat) | 58 | 41 | 41 | 40 | 40. |
|   Acetyl mix (40°–45° reaction temperature)— | | | | | |
|     Methylene chloride | 414 | 414 | 414 | 417 | 417. |
|     Acetic anhydride | 250 | 250 | 250 | 250 | 247. |
|     Sorbic acid | 12.7 | 18 | 12.7 | 2.5 | 83.3. |
|     Sulfuric acid | 1.0 | 1.2 | 1.2 | 1.0 | 1.2. |
| Hydrolysis: | | | | | |
|   p-Toluenesulfonic acid | 10 | 10 | 10 | 10 | 10. |
|   Hydroquinone | | | | | 0.7. |
|   Water | 108 | 62 | 62 | 68 | 68. |
|   Acetic acid | 0 | 109 | 109 | 68 | 68. |
|   Time at 50°–55° C | 4 | 2 | 3.5 | 4 | 2.5. |
| Product: | | | | | |
|   Acetyl D. S. | 2.39 | 2.80 | 2.45 | 2.45 | 2.3. |
|   Sorboyl D. S. | 0.067 | 0.1 | 0.06 | .02 | 0.32. |
|   180° Stability test | good | good | good | good | good. | be produced by hydrolysis of that mixture to the total number of moles of organic acid that would be present in the hydrolyzed mixture. In distinction with the method of referring to moles of acid even though present as anhydride, any specific reference to moles of anhydride is based on the molecular weight of the anhydride.

The ratio of sorboyl groups introduced into cellulose to the total number of acyl groups introduced into the cellulose has been found to be dependent upon the mole fraction of sorbic acid (i. e., sorboyl) in the anhydride mixture (calculated as moles acid obtainable on hydrolysis). In order to introduce sufficient sorbate (sorboyl D. S.=0.01) into the molecule to effect at least partial insolubilization, the mole fraction of sorbic acid in the mixture must be at least about 0.0023. In order to introduce sufficient sorbate (sorboyl D. S.=0.05 or greater) to give a product capable of complete insolubilization, the sorbic acid (i. e., sorboyl) mole fraction should be at least 0.015. When the mole fraction of sorbic acid is about 0.0045, the sorboyl D. S. of the cellulose ester produced is about 0.02. When the mole fraction of sorbic acid is about 0.13, the sorboyl D. S. of the cellulose ester produced is about 0.35. These figures are fairly accurate for the case of an anhydride mixture produced from sorbic acid and acetic anhydride.

In order to produce a useful cellulose acetate sorbate, the conditions of manufacture are critical, particularly in that there must be avoidance of sulfation or hydration of the sorboyl double bonds which has been found to destroy the valuable cross-linking properties. To avoid sulfation, the amount of sulfuric acid used as the esterification catalyst is kept at a minimum, and to this end methylene chloride is used as the solvent in the esterification process, since the catalytic activity of the sulfuric acid is more effective in such a medium. The sulfuric acid is a most satisfactory catalyst but must be used in a minimum catalytic amount for effecting reaction. The use of methylene chloride aids in establishing a minimum amount by increasing the effectiveness of the sulfuric acid as a catalyst. This minimum must be kept below about 1.5% based on the cellulose. To provide the proper environment, the methylene chloride is then used in an amount within the range of 4 to 8.5 times the weight of cellulose used.

The acylation process is carried out at any temperature at which acylation will take place but below temperatures which cause appreciable degradation of the cellulose or polymerization of the sorboyl groups. A particularly useful temperature range is 20° C. to 60° C.

The hydrolysis has also been found to require somewhat critical conditions so as to prevent sulfation or hydration of the double bonds and to effect selective hydrolysis of acetate groups. To this end it has been found that the usual hydrolysis conditions using large amounts of sulfuric acid must be avoided and an organic sulfonic acid, preferably benzene or p-toluenesulfonic acid, used in place thereof. Other sulfonic acids which are suitable are methane sulfonic acid, ethane sulfonic acid, and methionic acid.

The hydrolysis solution is the usual aqueous acetic acid obtained by adding water, or preferably aqueous acetic acid, to the esterification mixture so as to destroy the excess anhydride and produce an aqueous acetic acid medium for the hydrolysis. The water in the aqueous acetic acid medium should be sufficient to permit the desired degree of hydrolysis but not be so much as to cause precipitation of the product. This may be from 5–30% depending on the speed and degree of hydrolysis desired. The water content is preferably about 10 to 25% based on the weight of the acetic acid. The total amount of aqueous acetic acid used is similarly determined according to the requirements.

The hydrolysis temperature is kept on the average at 50°–55° C. without exceeding 65° C. during the hydrolysis to obtain the desired preferential hydrolysis while avoiding hydration of the sorboyl groups.

While sulfuric acid is not added for the hydrolysis step, the catalytic amount of sulfuric acid used in the esterification step need not be removed, since the maximum amount permissible for the esterification can be tolerated in the hydrolysis step provided the temperature of hydrolysis is kept within narrow limits defined above and one of the sulfonic acids set forth above is used in substantial amounts to speed up the selective hydrolysis to the desired degree. The amount of organic sulfonic acid required has been found to lie in the range of 5 to 15% based on the weight of the initial cellulose used.

These hydrolysis conditions lead to a cellulose acetate sorbate of the desired reduced total acyl D. S. and of the desired sorboyl D. S. The sorboyl groups are more difficultly displaced than the acetate group in this hydrolysis process catalyzed by the organic sulfonic acids set forth above, and there is thus no substantial loss of sorboyl groups in hydrolyzing from an acyl D. S. of 3 to an acyl D. S. of about 2.2.

In preparing cellulose acetate sorbate, care must be taken to avoid premature cross-linking where the sorboyl D. S. is above about 0.2. To this end, precautionary measures such as avoidance of strong light and oxygen should be practiced, and as shown in Example 5, a polymerization inhibitor such as hydroquinone is used where the reactions involved permit. In preparing a cellulose acetate sorbate of sorboyl D. S. above about 0.2, it is a preferred embodiment of the present invention to carry out the hydrolysis in the presence of an antioxidant-type polymerization inhibitor such as hydroquinone or its equivalent. The inhibitor is preferably introduced into the dope along with, or just after, addition of water or dilute acetic acid for the hydrolysis and is present during the hydrolysis step and subsequent washing steps. The amount of polymerization inhibitor based on the dope will be in the range of 0.01 to 1%, and where the sorboyl D. S. is 0.2 or greater, the preferred range will be 0.1 to 1%. Equivalents of hydroquinone which may be used as the inhibitor are t-butyl catechol, di-t-butyl hydroquinone, hydroquinone monobenzyl ether, catechol, pyrogallol, α-naphthylamine, diphenylamine and phenyl-β-naphthylamine. These are all organic antioxidant-type polymerization inhibitors.

In working up the cellulose acetate sorbate, much of the inhibitor remains in the spent acid from which it may be recovered, if desired. Further washing of the precipitated cellulose acetate sorbate removes most of that remaining, and the inhibiting effect of the small amount not removed can be overcome, when cross-linking is desired, by the use of an adequate amount of polymerization catalyst. It is advantageous, however, to carry out the entire washing process in the presence of a polymerization inhibitor and to leave a small amount in the product since a small amount of inhibitor will increase the shelf life of a product having a high sorboyl D. S.

The cellulose acetate sorbate when prepared in accordance with this invention has good stability as measured by color retention in the 180° C. heat stability test referred to hereinabove, a characteristic generally associated with low combined sulfate content.

The cellulose esters of total degrees of acyl substitution between about 3 and about 2.2, which include a sorboyl degree of substitution of about 0.01 to about 0.35, have been found to have properties quite similar to those of the corresponding acetate having a similar degree of substitution and they find similar utility depending upon their degree of substitution. They have, however, the added property which makes them superior to the corresponding esters of saturated acids in that they are capable of being insolubilized when subjected to polymerization conditions. The cellulose acetate sorbate falling within the scope of this invention finds utility, for instance, in production of rayon filaments, molding plastics, films, and lacquers. The preferred sorboyl D. S. for these uses lies in the range of about 0.02 to about 0.2 and the total degree of acyl substitution will be about the same as that of the corresponding ester of saturated acids for the same utility. The products of greatest utility have a sorboyl D. S. in the range of 0.05 to 0.12. For use in rayon and films, the preferred sorboyl D. S. is about 0.05 to 0.07 and the preferred total acyl D. S. is about 2.4 to about 2.6 for rayon and 2.4 to 2.9 for film. For use in plastics, a sorboyl D. S. of about 0.02 to about 0.10 and a total acyl D. S. of 2.2 to 2.4 are preferred. For use in the preparation of bristlelike filaments for use in paint brushes, the preferred sorboyl D. S. is 0.06 to 0.2 and the total acyl D. S. is 2.4 to 2.6. In all of these products the cellulose acetate sorbate is preferred.

The cellulose acetate sorbate of this invention is insolubilized by subjecting to polymerization conditions. Such conditions are thought to involve the catalytic activity of free radicals. In the case of translucent and transparent materials, polymerization can be effected simply by exposure to actinic light. In the case of translucent or opaque materials, a free radical-forming catalyst such as a peroxide, preferably an organic peroxide such as benzoyl peroxide, may be used as a catalyst for the insolubilization. The catalyst may be incorporated in the cellulose acetate sorbate composition. For example, in the case of filaments, it may be incorporated in the spinning composition, in the case of films, it may be incorporated in the lacquer or film-casting composition, and in the case of molding powders, it may be incorporated before or after grinding of the molding powder. A particularly useful method of insolubilization has been found to lie in the treatment of the cellulose acetate sorbate with a hot solvent which swells but does not dissolve the cellulose ester. For instance, a filament or film containing peroxides may be insolubilized by heating for 10 to 20 minutes with boiling water. Moreover, a filament or film either containing or not containing peroxides may be insolubilized by heating in boiling aqueous solutions containing a polymerization catalyst such as an aqueous alcohol solution of a water-soluble peroxide. Moreover, the insolubilization can be effected by heating in boiling water or aqueous alcohol in the absence of peroxides but substituting therefor radiation with actinic light. In place of aqueous alcohol, other aqueous solvents which swell but do not dissolve the cellulose ester may be similarly used. For instance, boiling 10–50% aqueous water-soluble swelling solvents containing benzoyl peroxide, hydrogen peroxide, potassium persulfate, and the like may be used. Swelling solvents which are useful in this method of insolubilization include aqueous solutions of water-soluble alcohols such as methanol, ethanol, propanol, and isopropyl alcohol, aqueous acetone, and the like. When using the boiling solvent method of insolubilization, the amount of catalyst in the solvent may be within the range of about 0.005 to about 5% of the swelling solvent. When the insolubilizing catalyst is incorporated in the cellulose ester, the amount of catalyst will ordinarily be within the range of about 0.1 to about 2% of the cellulose ester. While the insolubilization of the cellulose acetate sorbate is readily carried out in only a few minutes at 100° using the swelling solvent method of insolubilization, the insolubilization of a filament or film containing a catalyst but in the absence of any swelling solvent will require a temperature range up to about 150° to 200° C. to effect insolubilization in a corresponding length of time. However, the insolubilization in the absence of swelling solvents may also be carried out at temperatures as low as 50° C. if the heating is carried on over a period of several hours. In the absence of swelling solvents, a filament or film containing catalyst insolubilized satisfactorily at 140°–150° C. in one-half hour or less. The preferred method of insolubilization is that involving heating the filament or film with a swelling solvent.

The cellulose acetate sorbates of this invention, after substantial insolubilization, are generally somewhat harder and higher melting than before insolubilization but they are not rendered brittle by the insolubilization process as has been found to be the case with other cellulose esters of low molecular weight unsaturated acids after polymerization. In fact, they have greater elasticity than the corresponding ester containing no sorbate groups. Moreover, they are still fusible after insolubilization. Furthermore, they have greater water resistance and much less reversible water elongation. The cellulose acetate sorbates also have the advantage over other polymerizable cellulose esters in that their polymerization is controllable and the sorbic acid does not tend to insolubilize in place of combining with the cellulose ester during the process of its preparation. Furthermore, the degree of polymerization of any specific cellulose acetate sorbate ester of this invention is easily controllable. It has been found advantageous over other cellulose esters of unsaturated acids in that it is capable of being insolubilized at a very low degree of substitution of the unsaturated acid. It has a still further advantage in that the good properties of the cellulose ester are not lost in the introduction of sorbate groups. Moreover, there is no odor introduced by the incorporation of sorbate groups.

The insolubilized products of this invention have improved characteristics that make them particularly suited for various uses. The insolubility in organic solvents is particularly advantageous in paint brush bristles which show no swelling in paint solvent; in rayon fibers which have increased resistance to dry cleaning solvents; and in lacquer coatings which have increased resistance to water, alcohol, and nail lacquer solvents. The increased softening point is particularly advantageous in rayon fabrics which can withstand higher ironing temperatures.

The desirable combination of properties exhibited by the new products of this invention make them suitable for use in light-transmitting reinforced window glazing for solaria, poultry houses and safety areas, in airplane dopes, in artificial textile fibers such as rayon-type filaments and artificial brush bristles, in printing inks, in protective coatings, in adhesives, in laminated structures comprising paper, textile fibers or fabrics, wood, metals, glass, glass fibers, woven glass fabrics, leather, and the like, in insulation, in expanded porous structures and in plastic molding compositions and molded articles. They also find application in the impregnation of paper, textile fibers and fabrics, wood, leather, and other porous articles. Additionally, the new products of this invention are especially well adapted for all types of thermoplastic molding including compression, injection and extrusion molding and including the formation of films, filaments, and coated wire. The products of this invention may be put into the form for the uses indicated above before insolubilization or after insolubilization, whichever is preferred in the specific instance. Therefore, the improved properties possessed by the products of this invention suggest their use in many applications.

The present process of producing an insolubilizable cellulose ester by the introduction of a sorbate group has the advantage that the sorbic acid in the spent acids is readily recoverable by a process of extraction and subsequent distillation. In view of the small amount of sorbic acid which is required in the acylating mixture combined with the ease of recovery of spent sorbic acid makes the process commercially attractive. Moreover, the process of introducing the sorboyl groups in the same process in which the acetyl groups are introduced is particularly advantageous in that the number of operations is not increased.

This application is a continuation-in-part of copending application, Serial No. 203,797, filed December 30, 1950.

What I claim and desire to protect by Letters Patent is:

1. The method of making cellulose acetate sorbate having essentially the solubility characteristics of cellulose acetate of the corresponding D. S. and having the property of undergoing insolubilization in organic solvents by the action of polymerization catalysts, and having good stability in the 180° C. heat stability test, which comprises completely acylating cellulose in the presence of a substantial amount of methylene chloride and a minimum effective catalytic amount of sulfuric acid not exceeding 1.5% based on the cellulose weight with an anhydride mixture of acetic and sorbic acids in which the sorbic acid amounts to 0.0023 to 0.13 mole fraction of the organic acids and the anhydride value of the mixture amounts to at least 3 moles anhydride per anhydroglucose unit, and partially hydrolyzing the completely acylated cellulose by heating on the average at 50°–55° C. but not exceeding 65° C. to a total acyl D. S. in the range of 2.2 to 2.9 in the presence of 5 to 15% of an organic sulfonic acid selected from the group consisting of p-toluenesulfonic acid, benzene sulfonic acid, methane sulfonic acid, ethane sulfonic acid, and methionic acid based on the cellulose weight as a hydrolysis catalyst and no more sulfuric acid than was used in the esterification step and in the presence of aqueous acetic acid containing 5 to 30% water, and recovering a cellulose acetate sorbate having a sorboyl D. S. in the range of 0.01 to 0.35 from the hydrolysis mixture.

2. The method of making cellulose acetate sorbate having essentially the solubility characteristics of cellulose acetate of the corresponding D. S. and having the property of undergoing insolubilization in organic solvents by the action of polymerization catalysts, and having good stability in the 180° C. heat stability test, which comprises completely acylating cellulose in the presence of a substantial amount of methylene chloride and a minimum effective catalytic amount of sulfuric acid not exceeding 1.5% based on the cellulose weight with an anhydride mixture of acetic and sorbic acids in which the sorbic acid amounts to 0.0023 to 0.13 mole fraction of the organic acids and the anhydride value of the mixture amounts to at least 3 moles anhydride per anhydroglucose unit, and partially hydrolyzing the completely acylated cellulose by heating on the average at 50–55° C. but not exceeding 65° C. to a total acyl D. S. in the range of 2.2 to 2.9 in the presence of 5 to 15% p-toluenesulfonic acid based on the cellulose weight as a hydrolysis catalyst and no more sulfuric acid than was used in the esterification step and in the presence of aqueous acetic acid containing 5 to 30% water, and recovering a cellulose acetate sorbate having a sorboyl D. S. in the range of 0.01 to 0.35 from the hydrolysis mixture.

3. The method of making cellulose acetate sorbate having essentially the solubility characteristics of cellulose acetate of the corresponding D. S. and having the property of undergoing insolubilization in organic solvents by the action of polymerization catalysts, and having good stability in the 180° C. heat stability test, which comprises completely esterifying cellulose in the presence of methylene chloride in an amount 4 to 8.5 times the cellulose weight and in the presence of an effective catalytic amount of sulfuric acid not exceeding 1.5% based on the cellulose weight with an anhydride mixture of organic acids consisting essentially of sorbic acid in an amount within the range of 0.0023 to 0.13 mole fraction of said organic acids and a complementary amount of acetic acid, the anhydride in the mixture being at least 3 moles per anhydroglucose unit, and partially hydrolyzing the resulting triester by heating on the average at 50°–55° C. but not exceeding 65° C. to a total acyl D. S. within the range of 2.2 to 2.9 in the presence of no more sulfuric acid than was used in the esterification step and 5 to 15% p-toluenesulfonic acid based on the weight of the cellulose and in the presence of aqueous acetic acid containing 5 to 30% water, and recovering a cellulose acetate sorbate having a sorboyl D. S. within the range of 0.01 to 0.35.

4. The method of making cellulose acetate sorbate having essentially the solubility characteristics of cellulose acetate of the corresponding D. S. and having the property of undergoing insolubilization in organic solvents by the action of polymerization catalysts, and having good stability in the 180° C. heat stability test, which comprises completely acylating cellulose in the presence of a substantial amount of methylene chloride and an effective catalytic amount of sulfuric acid not exceeding 1.5% based on the cellulose with an anhydride mixture of organic acids consisting essentially of sorbic acid in an amount within the range of 0.0023 to 0.13 mole fraction of said organic acids and a complementary amount of acetic acid, the anhydride in the mixture being at least 3 moles per anhydroglucose unit, and partially hydrolyzing the resulting triester by heating on the average at 50°–55° C. but not exceeding 65° C. to a total acyl D. S. within the range of 2.2 to 2.9 in the presence of aqueous acetic acid containing 5 to 30% water and 5 to 15% p-toluenesulfonic acid based on the cellulose as a hydrolysis catalyst and no more sulfuric acid than was used in the esterification step, and recovering cellulose acetate sorbate having a sorboyl D. S. in the range of 0.01 to 0.35 from the hydrolysis mixture.

5. The method of making cellulose acetate sorbate having essentially the solubility characteristics of cellulose acetate of the corresponding D. S. and having the property of undergoing insolubilization in organic solvents by the action of polymerization catalysts, and having good stability in the 180° C. heat stability test, which comprises completely acylating cellulose in the presence of a substantial amount of methylene chloride and an effective catalytic amount of sulfuric acid not exceeding 1.5% based on the cellulose with an anhydride mixture of organic acids consisting essentially of sorbic acid in an amount within the range of 0.0023 to 0.13 mole fraction of said organic acids and a complementary amount of acetic acid, the anhydride in the mixture being at least 3 moles per anhydroglucose unit, and partially hydrolyzing the resulting triester by heating on the average at 50°–55° C. but not exceeding 65° C. to a total acyl D. S. within the range of 2.2 to 2.9 in the presence of aqueous acetic acid containing 5 to 30% water and 5 to 15% p-toluenesulfonic acid based on the cellulose as a hydrolysis catalyst and no more sulfuric acid than was used in the esterification step and an antioxidant as a polymerization inhibitor in an amount within the range of 0.01 to 1.0% based on the weight of the dope, and recovering cellulose acetate sorbate having a sorboyl D. S. in the range of 0.01 to 0.35 from the hydrolysis mixture.

6. The method of making cellulose acetate sorbate having essentially the solubility characteristics of cellulose acetate of the corresponding D. S. and having the property of undergoing insolubilization in organic solvents by the action of polymerization catalysts, and having good stability in the 180° C. heat stability test, which comprises completely acylating cellulose in the presence of a substantial amount of methylene chloride and an effective catalytic amount of sulfuric acid not exceeding 1.5% based on the cellulose with an anhydride mixture of organic acids consisting essentially of sorbic acid in an amount within the range of 0.0023 to 0.13 mole fraction of said organic acids and a complementary amount of acetic acid, the anhydride in the mixture being at least 3 moles per anhydroglucose unit, and partially hydrolyzing the resulting triester by heating on the average at 50°–55° C. but not exceeding 65° C. to a total acyl D. S. within the range of 2.2 to 2.9 in the presence of aqueous acetic acid containing 5 to 30% water and 5 to 15% benzene sulfonic acid based on the cellulose as a hydrolysis catalyst and no more sulfuric acid than was used in the esterification step and an antioxidant as a polymerization inhibitor in an amount within the range of 0.01 to 1.0% based on the weight of the dope, and recovering cellulose acetate sorbate having a sorboyl D. S. in the range of 0.01 to 0.35 from the hydrolysis mixture.

7. The method of making cellulose acetate sorbate having essentially the solubility characteristics of cellulose acetate of the corresponding D. S. and having the property of undergoing insolubilization in organic solvents by the action of polymerization catalysts, and having good stability in the 180° C. heat stability test, which comprises completely acylating cellulose in the presence of a substantially amount of methylene chloride and an effective catalytic amount of sulfuric acid not exceeding 1.5% based on the cellulose with an anhydride mixture of organic acids consisting essentially of sorbic acid in an amount within the range of 0.0023 to 0.13 mole fraction of said organic acids and a complementary amount of acetic acid, the anhydride in the mixture being at least 3 moles per anhydroglucose unit, and partially hydrolyzing the resulting triester by heating on the average at 50°–55° C. but not exceeding 65° C. to a total acyl D. S. within the range of 2.2 to 2.9 in the presence of aqueous acetic acid containing 5 to 30% water and 5 to 15% methane sulfonic acid based on the cellulose as a hydrolysis catalyst and no more sulfuric acid than was used in the esterification step and an antioxidant as a polymerization inhibitor in an amount within the range of 0.01 to 1.0% based on the weight of the dope, and recovering cellulose acetate sorbate having a sorboyl D. S. in the range of 0.01 to 0.35 from the hydrolysis mixture.

8. The method of making cellulose acetate sorbate having essentially the solubility characteristics of cellulose acetate of the corresponding D. S. and having the property of undergoing insolubilization in organic solvents by the action of polymerization catalysts, and having good stability in the 180° C. heat stability test, which comprises completely acylating cellulose in the presence of a substantial amount of methylene chloride and an effective catalytic amount of sulfuric acid not exceeding 1.5% based on the cellulose with an anhydride mixture of organic acids consisting essentially of sorbic acid in an amount within the range of 0.0023 to 0.13 mole fraction of said organic acids and a complementary amount of acetic acid, the anhydride in the mixture being at least 3 moles per anhydroglucose unit, and partially hydrolyzing the resulting triester by heating on the average at 50–55° C. but not exceeding 65° C. to a total acyl D. S. within the range of 2.2 to 2.9 in the presence of aqueous acetic acid containing 5 to 30% water and 5 to 15% ethane sulfonic acid based on the cellulose as a hydrolysis catalyst and no more sulfuric acid than was used in the esterification step and an antioxidant as a polymerization inhibitor in an amount within the range of 0.01 to 1.0% based on the weight of the dope, and recovering cellulose acetate sorbate having a sorboyl D. S. in the range of 0.01 to 0.35 from the hydrolysis mixture.

9. The method of making cellulose acetate sorbate having essentially the solubility characteristics of cellulose acetate of the corresponding D. S. and having the property of undergoing insolubilization in organic solvents by the action of polymerization catalysts, and having good stability in the 180° C. heat stability test, which comprises completely acylating cellulose in the presence of a substantial amount of methylene chloride and an effective catalytic amount of sulfuric acid not exceeding 1.5% based on the cellulose with an anhydride mixture of organic acids consisting essentially of sorbic acid in an amount within the range of 0.0023 to 0.13 mole fraction of said organic acids and a complementary amount of acetic acid, the anhydride in the mixture being at least 3 moles per anhydroglucose unit, and partially hydrolyzing the resulting triester by heating on the average at 50°–55° C. but not exceeding 65° C. to a total acyl D. S. within the range of 2.2 to 2.9 in the presence of aqueous acetic acid containing 5 to 30% water and 5 to 15% methionic acid based on the cellulose as a hydrolysis catalyst and no more sulfuric acid than was used in the esterification step and an antioxidant as a polymerization inhibitor in an amount within the range of 0.01 to 1.0% based on the weight of the dope, and recovering cellulose acetate sorbate having a sorboyl D. S. in the range of 0.01 to 0.35 from the hydrolysis mixture.

References Cited in the file of this patent

UNITED STATES PATENTS

| Number | Name | Date |
|---|---|---|
| 2,026,583 | Malm et al. | Jan. 7, 1936 |
| 2,322,575 | Hill | June 22, 1943 |
| 2,353,423 | Tinsley | July 11, 1944 |
| 2,396,165 | Ernsberger | Mar. 5, 1946 |